United States Patent Office 3,585,038
Patented June 15, 1971

3,585,038
SELECTED HEXAARYLBIIMIDAZOLE
OXIDATION SYSTEMS
Lawrence Anthony Cescon and Rolf Dessauer, Wilmington, Del., assignors to E. I. du Pont de Nemours and Company, Wilmington, Del.
No Drawing. Continuation-in-part of application Ser. No. 363,610, Apr. 29, 1964. This application Nov. 13, 1967, Ser. No. 682,624
Int. Cl. G03c 1/52
U.S. Cl. 96—90        12 Claims

ABSTRACT OF THE DISCLOSURE

An oxidizable mixture comprising a hexaarylbiimidazole and an oxidizable composition which is a selected p-arylenediteriaryamine, p-phenylene diamine admixed with a coupler, an imino hydrazine or N-acyl derivative thereof admixed with a coupler, an o-o'-disubstituted phenol, and an organic sulfhydryl compound. By subjecting the mixture to heat, pressure, light or electron beam, the hexaarylbiimidazole is converted to the corresponding triarylimidazolyl radical which oxidizes the oxidizable composition.

CROSS REFERENCES TO RELATED APPLICATIONS

This application is a continuation-in-part of application Ser. No. 363,610, filed Apr. 29, 1964, and now abandoned.

BACKGROUND OF THE INVENTION (1) Field of the invention

This invention is related to hexaarylbiimidazole compositions and to a method for oxidizing certain oxidizable compounds. More particularly, this invention is directed to admixtures of a hexaarylbiimidazole and selected oxidizable compositions, and to a method for activating, by means of heat, pressure, light or electron beam, the hexaarylbiimidazole which, in its activated free radical state, oxidizes the oxidizable composition.

(2) Description of the prior art

Oxidation is one of the most fundamental reactions of chemistry, and a variety of methods is known for conducting oxidation reactions. Examples of oxidation reactions in which a free radical is the oxidizing agent are: oxidation of $Fe^{++}$ to $Fe^{+++}$ by alkoxy radicals (Walling, "Free Radicals in Solution," John Wiley and Sons, 1957, page 33), oxidation of metallic sodium to $Na^+$ by triphenylmethyl radicals (Fieser and Fieser, "Advanced Organic Chemistry," Reinhold Publishing Corp., 1961, at page 352), oxidation of cyclohexane to cyclohexyl by phenyl radicals (Gilman, op. cit., particularly at page 1133), and oxidation of alkanes to alkyl radicals by chlorine radicals as the oxidant (Florkin and Stotz, "Comprehensive Bichemistry," Elsevier Publishing Co., 1962, vol. 2, Chapter I, on Mechanism of Organic Reactions by Bender and Breslow, particularly at page 204).

Free radicals such as those named above are highly reactive species which usually are relatively short-lived because of this high degree of reactivity. Unlike ordinary chemical reagents, most free radicals cannot be stored as such but are formed when needed as a result of input of energy to a precursor molecule by homolytic cleavage of a covalent bond in the precursor molecule. For instance, the radicals mentioned in the paragraph immediately above are obtained as follows from the precursors named: alkoxy radicals by heating a dialkyl peroxide; triphenylmethyl radicals by thermal dissociation of hexaphenylethane; phenyl radicals by heating or photolyzing benzoyl peroxide; and chlorine radicals by photolysis of chlorine. Other known radicals can be formed by these or other techniques from suitable precursors. However, the usefulness of free radicals and their precursors in the oxidation of oxidizable compounds varies with the nature and the properties of the particular radical or radical precursor employed. Thus, oxidizing power of radicals varies such that one radical species will not oxidize an oxidizable compound which another radical species will readily oxidize. For instance, whereas triphenylmethyl radicals fail to oxidize ferrous ion to ferric ion (Gilman, "Organic Chemistry," 2nd ed., John Wiley and Sons, 1943, vol. 1, at page 601), alkoxy radicals readily oxidize ferrous ion to ferric ion as noted above.

Although many free radicals may be used with some degree of success as oxidizing agents, those free radicals which have been reported thus far possess certain disadvantages as oxidizing agents of general utility. For instance, the usefulness of many free radicals as oxidants is limited in that the oxidations must be carried out in the absence of air because most radicals react extremely rapidly and preferentially with molecular oxygen (Gould, "Mechanism and Structure in Organic Chemistry," Henry Holt and Co., 1959, at pages 692–3). This is a property of even many so-called "stable radicals" such as 2,2-diphenyl-1-picrylhydrazyl (Ueda, Kuri, and Shida, J. Phys. Chem. 36, 1676 (1962)).

A further characteristic which limits the usefulness of many free radicals as oxidizing agents is that, once formed from their precursors, the radicals decompose or rearrange in reactions which may compete with a desired oxidation reaction and, therefore, low yields of the desired oxidized product result or undesirable by-products may be formed. For example, benzoyloxy radicals decompose irreversibly to form phenyl radicals and carbon dioxide (Fuson, "Reactions of Organic Compounds," John Wiley and Sons, 1962, at page 576), t-butoxy radicals break down irreversibly to form acetone and methyl radicals (Walling, op. cit., at page 31), and the radical $(C_6H_5)_3CCH_2$ rearranges to the less reactive

$$(C_6H_5)_2CCH_2C_6H_5$$

(Gould, op. cit., at page 755). Certain other radicals are limited in their usefulness because of their sensitivity to light; for example, triphenylmethyl possesses very poor photochemical stability ,Walling, op. cit., at pages 533–4; Fuson, op. cit., at page 577). The disadvantage of a radical which, when acting as an oxidant, forms detrimental by-products is shown by 2,2'-azobis(2-methylpropionitrile) or other azo compounds which, when incorporated in a viscous medium such as the gelatin coating of photographic film, decompose when heated or irradiated with ultraviolet light to form radicals and nitrogen as a by-product. The latter causes bubbles to form in the gelatin and thus clouds the photographic film.

A particular disadvantage of most known free radicals as oxidizing agents is that, once formed from the precursor molecule, they do not readily revert to the precursor molecule. Thus, if their oxidizing power is not utilized when first generated, the radicals undergo other reactions, such as disproportionation, rather than revert to the precursor. This results in failure to obtain the full oxidizing power of the radicals in the desired reaction and, as a result, only very low yields of the desired reaction products are obtained.

For their use as sources of oxidizing free radicals, the radical precursors should possess a combination of certain properties. For example, for many uses a radical precursor is needed which is stable to its environment during ordinary storage but which can be thermally-, pressure- or light-activated to generate radicals when needed. Thus, the radical precursor should be stable to ordinary temperature, shock, air, and visible light. Examples of storage-unstable, commonly used, free radical precursors are hexaarylethanes, diacyl peroxides, hydrogen peroxides, and diazomethane.

An undesirable property shown by certain radical precursors, particularly those such as carbon tetrachloride or tetrabromide, tetrachlorobenzene, bromotrichloromethane, tetrachloroethane, or hexachlorobutadiene used as radical sources for oxidation of hydrogen containing compounds, is the generation of strongly acidic by-products as a result of the oxidation reaction. The presence of such strong acids as the hydrogen halides is very detrimental should the desired oxidation reaction be carried out in the presence of acid-sensitive materials. Certain other radical precursors themselves are inactivated to radical generation under conditions of moderate acidity or basicity; for example, tetraphenylhydrazine, a known radical precursor, reacts with acids to give a mixture of colored ionic species which are not readily converted to free radicals (see Lewis and Bigeleisen, J.A.C.S. 64, 2808 (1942).

Other radical precursors, which function well to produce radicals which are good oxidizing agents, possess little practical utility because of their hazardous nature. This makes their handling either alone or in combination with other materials dangerous. Examples of such hazardous radical precursors are the volatile, highly toxic halocarbons such as carbon tetrachloride, carbon tetrabromide and tetrachloroethylene, and explosive substances such as acetyl peroxide and other peroxides (see Sax, "Handbook of Dangerous Materials," Reinhold Publishing Corp., 1951, particularly at pages 5, 6, 83, 84, 369). Further, those radical precursors which are volatile under ambient conditions suffer from the disadvantage that they can be lost readily by evaporation from any composition containing them.

The present invention provides a method for oxidizing certain oxidizable compositions wihch comprises effecting the dissociation of said hexaarylbiimidazoles into triarylimidazolyl radicals in the presence of the oxidizable compositions. Means for generating the triarylimidazolyl radicals, which are the active oxidizing agents of this invention, include heat, light, pressure and electron beams. While the oxidizable substance is oxidized, the starting hexaarylbiimidazole is reduced to the corresponding triarylimidazole, so that the novel activatable chemical change compositions can be termed oxidation-reduction compositions. For simplicity, the overall oxidation-reduction reaction that ensues on activating such compositions is referred to herein as the oxidation reaction.

The biimidazoles and the oxidizing radicals they produce possess advantageous properties and overcome many disadvantages of prior systems, thereby enabling oxidations to be conducted in a practical, controlled manner. For example, the 2,2',4,4',5,5'-hexaarylbiimidazoles are stable to ordinary chemical environments until suitably activated by a means such as heat, pressure, light or electron beams. This allows the oxidation reaction to be "triggered" at the discretion of the operator. The biimidazoles are normally crystalline and non-volatile, compatible with a wide variety of substances, and not hazardous, being non-explosive and non-toxic to animals. Biimidazole dissociation to the oxidizing imidazolyl radicals occurs readily, according to the method of the invention, even in the presence of mild acids or bases. When activated by light, the biimidazoles dissociate to the oxidizing radicals in high quantum yield. Both the biimidazoles and the imidazolyl radicals are essentially non-reactive to air under ambient use conditions. The imidazolyl radicals, when not utiilzed as oxidants, readily recombine in high yield to reform the biimidazole from which the oxidizing radicals can again be generated by suitable activation.

The present invention also provides oxidizable compositions which can be oxidized in a manner free of the deficiencies of the art compositions recited above.

SUMMARY OF THE INVENTION

The compositions of this invention comprise:

(A) A 2,2',4,4',5,5'-hexaarylbiimidazole wherein the aryl groups contain one to two rings which can be substituted with substituents that are inert to component (B) and that have a Hammett para sigma value between about −.5 to +.8 and are free of Zerewitinoff hydrogen; in intimate admixture with (B) An oxidizable compound having a formal oxidation potential of 1.35 volts or less relative to a standard calomel electrode and being selected from the class consisting of (1) p-Arylenediteriaryamines wherein the arylene groups are phenylene or diphenylene and the groups attached to the amine nitrogen are lower alkyl or lower alkylene;

(2) p-Phenylenediamines wherein one amino group is primary and the other is tertiary in which the groups attached to the tertiary nitrogen are lower alkyl, said p-phenylenediamines being in admixture with a coupling compound selected from phenols, N,N-di(lower)alkyl phenylamines, or active methylene coupling compounds;

(3) Imino hydrazides and their N-acyl derivatives which are oxidizable to diazonium compounds, in admixture with a coupling compound selected from phenols, N,N-disubstituted-arylamines, or active methylene coupling compounds;

(4) o,o'-Disubstituted phenols wherein the substituents are halo, lower alkyl or lower alkoxy; and (5) Organic sulfhydryl compounds.

The process of this invention comprises oxidizing the composition of the invention by subjecting it to heat, pressure, light or an electron beam.

The products of the oxidation process of this invention are known compounds useful in their ordinary applications.

DESCRIPTION OF THE INVENTION

(A) The hexaarylbiimidazole

These ingredients of the composition of the invention are the 2,2',4,4',5,5'-hexaarylbiimidazoles (sometimes referred to herein as 2,4,5-triarylimidazolyl dimers) that are dissociable to the corresponding triarylimidazolyl radicals.

The aryl groups may be the same or different; preferably they are the same. They can be carbocyclic or heterocyclic and can be substituent-free or can bear substituents that do not interfere with the dissociation step or the subsequent oxidation. Preferably the aryl groups are phenyl, biphenyl, naphthyl, furyl or thienyl. Suitable substituents for the aryl groups are those which have Hammett para sigma values from −.5 to +.8 and which are free of Zerewitinoff hydrogren, i.e., have no hydrogens reactive towards methyl magnesium iodide. Representative substituents and their sigma values (relative to H=.00), as given by Jaffe, Chem. Rev. 53, 219–233 (1953) are: methyl (−0.17), ethyl (−0.15), t-butyl (−0.20), phenyl (0.01), styryl (approx. −0.05), trifluoromethyl (0.55), chloromethyl (0.18), cyanomethyl (0.01), 2-carboxyethyl (−0.07), butoxy (−0.32), phenoxy (−0.03), fluoro (0.062), chloro (0.227), bromo (0.232), iodo (0.276), methylthio (−0.05), methylsulfonyl (0.73), nitro (0.78), ethoxycarbonyl (0.52), and cyano (0.63). Thus the substituents may be halogen, cyano, hydrocarbyl (including alkyl, haloalkyl, cyanoalkyl, and aryl), alkoxyl, aroxyl, alkylthio, arylthio, alkyl sulfonyl, arylsulfonyl and nitro. Preferably the aryl radicals are carbocyclic, particularly phenyl; while the preferred substituents have Hammett sigma values in the range −.4 to +.4, particularly, alkyl, alkoxy, Cl, F and Br.

Preferably, also, any carbon chain recited above contains one to six carbon atoms. The term "lower" as used herein denotes such a carbon chain, as for example, "lower alkyl."

In a preferred biimidazole class the 2 and 2' aryl groups are phenyl rings bearing an ortho substituent having a Hammett sigma value in the range —.4 to +.4 and in particular are F, Cl, Br, lower alkyl or lower alkoxy groups.

Representative hexaarylbiimidazoles which may be used in the practice of this invention are:

2,2'-bis(o-bromophenyl)-4,4',5,5'-tetraphenylbiimidazole,
2,2'-bis(p-bromophenyl)-4,4',5,5'-tetraphenylbiimidazole,
2,2'-bis(p-carboxyphenyl)-4,4',5,5'-tetraphenylbiimidazole,
2,2'-bis(o-chlorophenyl)-4,4',5,5'-tetrakis(p-methoxyphenyl)biimidazole,
2,2'-bis(o-chlorophenyl)-4,4',5,5'-tetraphenylbiimidazole,
2,2'-bis(p-chlorophenyl)-4,4',5,5'-tetrakis(p-methoxyphenyl)biimidazole,
2,2'-bis(p-cyanophenyl)-4,4',5,5'-tetrakis(p-methoxyphenyl)biimidazole,
2,2'-bis(2,4-dichlorophenyl)-4,4',5,5'-tetraphenylbiimidazole
2,2'-bis(2,4-dimethoxyphenyl)-4,4',5,5'-tetraphenylbiimidazole,
2,2'-bis(o-ethoxyphenyl)-4,4',5,5'-tetraphenylbiimidazole,
2,2'-bis(m-fluorophenyl)-4,4',5,5'-tetraphenylbiimidazole,
2,2'-bis(o-fluorophenyl)-4,4',5,5'-tetraphenylbiimidazole,
2,2'-bis(p-fluorophenyl)-4,4',5,5'-tetraphenylbiimidazole,
2,2'-bis(o-hexoxyphenyl)-4,4',5,5'-tetraphenylbiimidazole,
2,2'-bis(o-hexylphenyl)-4,4',5,5'-tetrakis(p-methoxyphenyl)biimidazole,
2,2'-bis(3,4-methylenedioxyphenyl)-4,4',5,5'-tetraphenylbiimidazole,
2,2'-bis(o-methoxyphenyl)-4,4',5,5'-tetraphenylbiimidazole,
2,2'-bis(p-methoxyphenyl)-4,4'-bis(o-methoxyphenyl) 5,5'-diphenylbiimidazole,
2,2'-bis(p-methoxyphenyl)-4,4',5,5'-tetraphenylbiimidazole,
2,2'-bis(m-nitrophenyl)-4,4',5,5'-tetrakis(2,4-dimethoxyphenyl)biimidazole,
2,2'-bis(p-phenylsulfonylphenyl)-4,4',5,5'-tetraphenylbiimidazole,
2,2'-bis(p-sulfamoylphenyl)-4,4',5,5'-tetraphenylbiimidazole,
2,2'-bis(2,4,6-trimethylphenyl)-4,4',5,5'-tetraphenyl)biimidazole,
2,2'-di-4-biphenylyl-4,4',5,5'-tetraphenylbiimidazole,
2,2'-bis(2,4,6-trimethylphenyl)-4,4',5,5'-tetraphenylbiimidazole,
2,2'-di-9-phenanthryl-4,4',5,5'-tetrakis(p-methoxyphenyl)biimidazole,
2,2'-diphenyl-4,4',5,5'-tetra-4-biphenylylbiimidazole,
2,2'-diphenyl-4,4',5,5'-tetra-2,4-xylylbiimidazole,
2,2'-di-3-pyridyl-4,4',5,5'-tetraphenylbiimidazole,
2,2'-di-3-thienyl-4,4',5,5'-tetraphenylbiimidazole,
2,2'-di-o-tolyl-4,4',5,5'-tetraphenylbiimidazole,
2,2'-di-p-tolyl-4,4'-di-o-tolyl-5,5'-diphenylbiimidazole,
2,2'-di-2,4-xylyl-4,4',5,5'-tetraphenylbiimidazole,
2,2'-4,4',5,5'-hexa-4-biphenylylbiimidazole,
2,2',4,4',5,5'-hexakis(p-benzylthiophenyl)biimidazole,
2,2',4,4',5,5'-hexa-1-naphthylbiimidazole and
2,2',4,4',5,5'-hexaphenylbiimidazole.
2,2'-bis(o-chlorophenyl)-4,4',5,5'-tetrakis(m-methoxyphenyl)biimidazole,
2,2'-bis(o-chlorophenyl)-4,4',5,5'-tetrakis(m-betaphenoxyethoxyphenyl)biimidazole,
2,2'-bis(2,6-dichlorophenyl)-4,4',5,5'-tetraphenylbiimidazole,
2,2'-bis(o-nitrophenyl)-4,4',5,5'-tetraphenylbiimidazole,
2,2'-bis(o-nitrophenyl)-4,4',5,5'-tetrakis(m-methoxyphenyl)biimidazole,
2,2'-bis(2-nitro-5-methoxyphenyl)-4,4',5,5'-tetraphenylbiimidazole,
2,2'-bis(o-chlorophenyl)-4,4'-bis(p-methoxyphenyl) 5,5'-diphenylbiimidazole,
2,2'-bis(o-chloro-p-methoxyphenyl)-4,4',5,5'-tetraphenylbiimidazole,
2,2'-bis(3-pyridyl)-4,4',5,5'-tetraphenylbiimidazole.

The preferred hexaarylbiimidazole is 2,2'-bis(o-chlorophenyl)-4,4',5,5'-tetraphenylbiimidazole.

The biimidazoles are conveniently obtained by known methods as more particularly described by Italian Pat. 707,086 and by Hayashi et al., Bull. Chem. Soc., Japan, 33, 565 (1960). The preferred method, involving oxidative dimerization of the corresponding triarylimidazole with ferricyanide in alkali, generally yields the 1,2'-biimidazoles, although other isomers, such as the 1,1',1,4',2,2', 2,4' and 4,4'-biimidazoles are sometimes also obtained admixed with the 1,2'-isomer. For the purposes of this invention, it is immaterial which isomer is employed so long as it is photodissociable to the imidazolyl radical as discussed above.

Biimidazoles useful in this invention are described in South African patent application 3,627/63, published Aug. 12, 1963, and in British Pat. 997,3936, published July 7, 1965.

(B) The oxidizable component

The oxidizable compounds of the present invention have a formal oxidation potential of 1.35 volts or less relative to a standard calomel electrode, with the sign of the potential designated according to the European convention [see Kortum and Bockris, "Textbook of Electrochemistry," Vol. I, Elsevier, New York (1961)]. Formal oxidation potentials are conveniently measured by cyclic voltammetry [see, for example, Sevcik, Coll. Czechoslov. Chem. Communs. 13, 349 (1948); Mizoguchi et al., J. Am. Chem. Soc. 84, 2058 (1962); in particular Galus et al., J. Electroanal. Chem. 5, 17 (1963)]. The formal potential is the experimentally observed potential when equal formal concentrations of the oxidized and reduced forms of a material in acetonitrile solution exist at the electrode-solution interface during the measurement [see, for example, Smith et al., Talanta 2, 348 (1959); Lingane, "Electroanalytical Chemistry," 2nd ed., Interscience, New York 1958, p. 58; Delahay, "Instrumental Analysis," Macmillan Co., New York, 1957, p. 16]. Anhydrous acetonitrile is the preferred solvent for the cyclic voltammetry measurement since its dielectric constant is high and it is an excellent solvent. Prior to use, it is purified by distillation and dried to reduce moisture content to less than 100 p.p.m. The final index of quality is a good blank (flat) polarogram by cyclic voltammetry after the acetonitrile is made 0.5 formal with dry lithium perchlorate.

More specifically, the oxidizable compounds are taken from the following classes of compounds:

(a) p-Arylenedietertiaryamines,

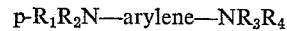

$$p\text{-}R_1R_2N\text{---}arylene\text{---}NR_3R_4$$

where the R groups are lower alkyl or lower alkylene, and the arylene is a phenylene or diphenylene moiety, exemplified by N,N,N',N' - tetramethyl-p-phenylenediamine, N,N,N',N' - tetramethylbenzidine, 1,1' - (4,4'-biphenylene) dihexamethyleneimine, and N,N,N',N'-tetrabutylbenzidine dihydrochloride, oxidizable to the corresponding highly colored and useful Wurster's salts.

(b) p-Phenylenediamines wherein one amino group is tertiary, the other primary, such as N,N-dimethyl-p-phenylenediamine, N,N'-diethyl-p-phenylene diamine, N,N-dipropyl-p-phenylene diamine, N,N-dibutyl-p-phenylene diamine, and N,N-dimethyl toluene-2,5-diamine, in combination with a coupling component that is less easily oxidized than the diamine such as:

(i) a phenol having a free coupling, e.g. para-position and optionally bearing halo, alkyl and alkoxy substituents in other positions, e.g. phenol, o-cresol, m-cresol, o-ethylphenol, o-chlorophenol, o-methoxyphenol 1-naphthol and 2-methyl-1-naphthol, 7-acetylamino-1-naphthol, and 2-naphthol;

(ii) an N,N-dialkyl arylamine having a free para-position such as N,N-dimethylaniline, N,N-diethylaniline, N,N-dimethyl-m-toluidine and the like described above;

(iii) an active methylene coupling compound (i.e. containing an enolizable hydrogen) such as beta-diketones (e.g. benzoylacetone), beta-keto esters (e.g. ethyl acetoacetate, diethyl malonate), beta-ketoamides (e.g. 4'-chloroacetoacetanilide, 2 - benzoyl-m-acetanisidide and beta-keto nitriles (e.g. 2-thenoyl acetonitrile).

The hexaarylbiimidazoles, upon activation, oxidize such phenylene diamine/phenol, phenylene diamine/dialkyl aryl amine and phenylene diamine/active methylene compound mixtures to indophenols, indoanilines and azomethines, all normally colored and useful for dyeing various substrates.

The chemistry of such oxidative condensation reactions has been reviewed by Vittum and Weissberger in J. Phot. Sci. 2, 81 (1954) and 6, 157 (1958) and by Thirtle, "The Chemistry of Dye-Forming Development," Organic Chemical Bulletin, Vol. 34, No. 3, Eastern Organic Chemicals Dept., Distillation Products Industries, Division of Eastman Kodak Co., 1962.

(c) Hydrazones, more specifically imino hydrazides and their N-acyl derivatives, oxidizable to diazonium compounds, in combination with a coupling component. Included are hydrazones and N-acyl hydrazones of benzothiazolinones, benzoselenazolinones, benzoazolinones, benzimidazolinones, and carbostyrils, which may be represented by the formula:

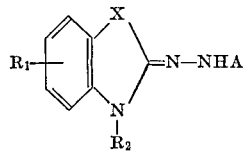

where $R_1$ stands for H or at least one halo, alkyl or alkoxyl, $R_2$ is alkyl, X is O, S, Se, N-alkyl or —CH=CH—, and A is an acyl, aroyl or organic sulfonyl radical.

Hexaarylbiimidazoles, upon activation, oxidize such hydrazones and N-acyl hydrazones in the presence of the coupling compounds to produce azo dyes. The chemistry of the coupling reaction is described by Hunig and Fritsch, Ann. 609, 143 (1957). Representative diazonium precursors are the hydrazones of 6-methoxy-3-methyl-2-(3H)-benzothiazolone, 3-methyl - 2 - (3H)-benzothiazolone, and 6-chloro-3-methyl-2-(3H)-benzothiazolone. Reactive couplers include N,N - diethylaniline, N,N-dimethyl-m-toluidine, N - 2 - cyanoethyl-N-methyl-1-naphthylamine, phenolics such as phenol, m-cresol, 1-naphthol, 6-sulfamido-2-naphthol and hydroquinone, and active methylene compounds such as acetacetamide, 2-thenoylacetonitrile and other beta-keto compounds described above under (b). Other combinations of hydrazones and couplers as well as composite hydrazone-coupler combinations as disclosed below oxidazable by the present process are described in U.S. Pat. 3,076,721. Such hexaarylbiimidazole/hydrazone/coupler compositions are particularly useful for producing images; for example, by ultraviolet irradiation through a stencil or negative of a coating of the composition on paper.

Photo-sensitive papers containing the N-acyl hydrazones defined above generally have a longer shelf life than those with the corresponding unacylated hydrazones. Suitable N-acyl hydrazones that are operative in the present invention are disclosed in U.S. Pat. 3,076,721. Typical are 3 - methyl - 2 - benzothiazolinone acetylhydrazone, 3 - methyl - 2 - benzoselenazolinone propionylhydrazone, 3 - ethyl - 2 - benzoxazolinone benzenesulfonylhydrazone, 1,3 - dimethyl - 5 - methoxy - 2 - benzimidazolinones benzoylhydrazone, 1 - methyl - carbostryil phenoxyacetylhydrazone and 3 - methyl - 2 - benzothiazolinone p-toluenesulfonylhydrazone. Any of the couplers described above may be employed therewith.

When the acyl radical, A, stands for GCO, where G is a radical capable of coupling with the diazonium compound generated from the substituted hydrazone, such as a 1 - naphthol - 2 - carbonyl group or a 1 - phenyl 5 - oxo - 3 - pyrazolyl carbonyl group, the N-acyl compound constitutes a composite hydrazone-coupler compound which contains both the diazo component and the coupler component in the same molecule and thus provides the colored compound directly on being oxidized in the present method. Examples are 3 - methyl - 2 - benzothiazolinone 1 - phenyl - 5 - oxo - 3 - pyrazolylcarbonylhydrazone.

(d) o,o'-Disubstituted phenols wherein the substituents are halo, alkyl or alkoxyl groups and the position para to the hydroxyl is unsubstituted.

Examples are 2,6-difluorophenol, 2,6-dibromophenol, 2,6-dimethyl phenol, 2,6-di-isopropyl phenol, 2,6-di-t-butyl phenyl, 2,6-dimethoxyphenol, and 2,6-di-n-butoxyl phenol, which the hexaarylbiimidazoles, when activated, oxidize to the corresponding colored and useful diphenoquinones.

(e) Organic sulfhydryl compounds: Included are aliphatic (including cycloaliphatic), aromatic and heterocyclic compounds containing one or more thio groups, including thio acids and dithio acids, which are oxidized by the present method to the corresponding disulfides.

Representative aliphatics are alkanethiols such as 1-butanethiol, ethanethiol, 2-propanethiol, α-toluenethiol, 1-dodecanethiol, 2,4 - dimethyl - 3 - pentanethiol, cyclohexanethiol, 3 - phenyl - 2 - propene - 1 - thiol, and tetrahydro - 2 - naphthylenethiol; polythiols such as 1,2-ethanedithiol, 1,6 - hexandithiol, 1,2,3 - propanetrithiol, neopentanetetrathiol, and polymers containing thiol groups such as the thiol-terminated alkyl disulfide polymers, e.g. $HS\mathord{-}(CH_2)_xSS\mathord{-}_7(CH_2)_xSH$; substituted thiols such as 3-hydroxypropane - 1 - thiol, dithioerythritol, 2 - chloroethanethiol, 2 - butoxyethanethiol, 1 - thiosorbitol, 2-methyl - 2 - mercapto - 4 - pentanone, 1,3 - dimercapto-2 - propanone, bis(2 - mercaptoethyl)sulfide, ethyl thioacetate, 2 - mercaptoisobutyric acid, dodecyl thiopyruvate, diethyl mercaptomaleate, cysteine, phenyl 2 - amino - 4 - methyl - 4 - mercaptovalerate. The aromatic thiols include carbocyclics, such as benzenethiol, p-toluenethiol, 2 - chloro - 4 - phenylbenzenethiol, 4 - bromo - 1 - naphthalenethiol, 2,6 - naphthalenedithiol, 2' - mercaptoacetophenone, 2 - mercaptoanthraquinone, ethyl p-mercaptobenzoate, and 4,4' - thiodibenzenethiol, and heterocyclic sulfhydryl compound such as 2-mercaptoquinoline, 2-(2-mercaptoethyl)pyridine, 2 - mercaptobenzothiazole, 3 - furanthiol, 3 - thiophenethiol and 3,4 - thiophenedithiol. Typical thio and dithio acids may also be employed, such as thioacetic acid, dithioacetic acid, dithiobenzoic acid, and thionaphthoic acid. There may also be used thio carbonyl compounds that can form a mercapto group by a tautomeric shift of hydrogen; for example, thiourea, which reacts as the pseudo-thiourea.

(C) Preparation of the compositions of the invention

The novel compositions of this invention are prepared by mixing an oxidizable compound of the defined classes, having a formal oxidation potential as defined with a dissociable 2,2',4,4',5,5'-hexaarylbiimidazole, as defined. Preferably the oxidizable compound and the biimidazole will be intimately mixed, as for example, by dissolving them in a suitable mutual solvent, or by mechanically mixing or blending them in the dry state or in the presence of a liquid medium to form a paste, slurry, or dispersion.

The proportions of the ingredients of the compositions of this invention are not critical. For synthetic purposes, however, the yields of the oxidized product produced by the process of this invention are highest when a slight excess of the hexaarylbiimidazole based on the oxidizable species is employed. Since each biimidazole molecule yields two oxidizing imidazolyl radicals, each biimidazole molecule is equivalent to two oxidizable sites of the oxidizable component. For certain other reactions which occur by a cyclic mechanism or when high synthesis yields are not important, small amounts of biimidazole relative to the oxidizable species suffice.

It is often beneficial and desirable to incorporate other components into the novel chemical change compositions of this invention to provide for highly intimate contact between the biimidazole and the oxidizable substance, particularly when both are normally solid. Thus there may be used solvents which are essentially inert toward the biimidazole and the oxidizable compound, to dissolve these components and to also provide a fluid medium for their convenient handling. Representative solvents are formamide, N,N - dimethylformamide, N,N-dimethylacetamide, hexanamide, stearamide, acetone, methanol, ethanol, 1-propanol, 2-propanol, butanol, ethylene glycol, polyethylene glycols, ethyl acetate, ethyl benzoate, benzene, o-dichlorobenzene, toluene, dimethylsulfoxide, pyridine, tetrahydrofuran, dioxane, and mixtures thereof in various proportions as may be required to attain the desired solution.

Polymeric material, particularly light-transparent and film-forming polymers may also serve as binders, carriers and oxidation process media; thus, oxidizable compound, biimidazole, polymer, with or without a mutual solvent, may be mixed, then extruded, cast, pressed or otherwise formed into supported or unsupported films or shaped articles. Polymeric materials that will be found applicable are polyvinyl alcohol, ethyl cellulose polyvinyl chloride, polystyrene, polyvinyl acetate, poly(methyl methacrylate), cellulose acetate, cellulose butyrate, copoymers of vinyl monomers, gelatin, and polyethylene. Other suitably inert materials which may be used include glasses, resins, and waxes. The amount of any such medium will be congruent with the particular utility which the invention serves. Usually, however, it will range from about 0.5 part of about 500 parts by weight per part of combined weight of oxidizable compound and hexaarylbiimidazole.

The heat-, light- and pressure-sensitive compositions of this invention may be utilized as coatings, impregnants or additives for various substrates, such as those frequently used in the graphic arts and in decorative applications. The substrates may be rigid or flexible, solid or porous, either opaque or transparent to light. They may include paper ranging from tissue paper to heavy cardboard; films of plastics and polymeric materials such as regenerated cellulose, cellulose acetate, cellulose nitrate, poyethylene, poly(methyl methacrylate), polyvinyl chloride; textile fabrics; glass; wood and metals. Substrates in which a light-sensitive composition is dissolved or which bear the composition as a coating on the side away from the light source must be transparent to that wavelength of radiation used to activate the biimidazole.

For long term storage stability of these compositions, techniques may be used for maintaining the biimidazole and the oxidizable substance in physically distinct, chemically inter-reactive relationship, as described in U.S. Pat. 2,063,654–7, 3,076,721 and 3,094,417, or for encapsulating one or both of the reactants as small particles in protective jackets, as described in U.S. 2,800,457–8 and 3,015,128.

(D) The process of the invention

Upon subjecting the compositions of the invention to heat, pressure, light or electron beams, the biimidazole component dissociates to its free radical form. The free radical then reacts with, and oxidizes the oxidizable composition.

When the oxidation takes place as a result of supplying heat to the compositions of this invention, the compositions are simply heated to or above the dissociation temperature of the biimidazole by any heating means, such as ovens, infrared lamps, heated metal plates, and the like. In general, the biimidazoles dissociate thermally at temperatures below about 180° C. but above about 60° C.

When oxidation is accomplished by applying pressure, the compositions are subjected to pressures ranging from about 500 to about 50,000 pounds/square inch, depending on the particular biimidazole and the oxidizable compound employed. Quite often, the composition need only be rubbed with a spatula or struck with a hammer against a solid surface.

The biimidazoles characteristically absorb short wavelength light having wavelengths in the 2000–4200 A. region such as ultraviolet light, and are photodissociable to triarylimidazolyl radicals by such light, particularly light rich in the 2500–2750 A. wavelengths. Hence, when oxidation is accomplished by subjecting the compositions to light, such wavelengths are employed. Photoactivation is the preferred method of inducing oxidation since the biimidazole dissociation often proceeds with a quantum yield of about 1.0, which indicates that for every quantum of absorbed radiation a biimidazole molecule dissociates. In general, too, the oxidation product yield, i.e., of the triarylimidazolyl/oxidizable substance reaction, is also high. Any convenient light source may be used to activate the light-sensitive compositions and induce color formation. In general, light sources that supply radiation in the region between about 2000 A. and about 4200 A. are particularly useful. Examples are sun lamps, electronic flash guns, germicidal lamps, ultraviolet lamps providing specifically light of short wave length (2537 A.) and lamps providing light of long wave length (3663 A.). The light exposure time will vary from a fraction of a second to several minutes depending upon the intensity of the light, its distance from the light-sensitive composition, the nature and amount of the light-sensitive composition available, and the intensity of color in the image desired. There may also be used coherent light beams, for example pulsed nitrogen lasers, argon ion lasers and ionized neon II lasers, whose emissions fall within or overlap the ultraviolet absorption bands of the triarylimidazolyl dimer.

Ultraviolet emitting cathode ray tubes widely useful in printout systems for writing on photosensitive materials, are also useful for oxidizing the subject compositions to their colored form. These in general involve a UV-emitting phosphor internal coating as the means for converting electrical energy to light energy and a fiber optic face plate as the means for directing the radiation to the photosensitive target. For purposes of this invention, the phosphors should emit strongly below 420 m$\mu$ (4200 A.) so as to substantially overlap the near UV-absorption characteristic of the novel imaging compositions. Representative phosphors include the P4B (emitting at 300–500 m$\mu$, peaking at 410 m$\mu$), P16 (330–460, peaking at 380 m$\mu$) and P22B (390–510, peaking at 450 m$\mu$) types. (The Electronic Industries Association, New York, N.Y., assigns P-numbers and provides characterizing information on the phosphors; phosphors with the same P-number have substantially identical characteristics.)

Various cathode ray tube printout systems, including a multipurpose electronic information output system comprising a central electronic system feeding and operating a multiplicity of CRT printers, each capable of performing a separate function and of providing soft or hard copy are described in James and Witterholt, Ser. No. 622,526, filed Mar. 13, 1967, incorporated herein by reference. The imaging compositions of this invention are useful in such a system.

For the purposes of this invention the biimidazole's spectral sensitivity may be extended to visible light, which the biimidazole does not normally absorb, by incorporating therein visible light-absorbing energy transfer agents such as Erythrosin B, Rose Bengal, or other phthalein dye, Diethyl Orange, Acridine Orange, or the like acridine dye, 3,3'-diethyl-4,5,4',5'-dibenzoxacarbocyanine p-toluene sulfonate, 3,3'-diethyloxaselenacarbocyanine iodide, 3,3'-din-butyl-9-methylthiacarbocyanine iodide, 3,3'-diethyl thiaselenacarbocyanine iodide, 3,3'-diethyl selenacarbocyanine iodide, or the like carbocyanine dye.

The hexaarylbiimidazoles are also activatable by ionizing radiation. For the purposes of this invention electron beams having a wide range of electron energies may be used, for example beams having average electron energies as low as about 15 killovolts and as high as about 1.7 million electron volts.

The reaction time for oxidizing an oxidizable compound by the process of this invention is not critical. It may range from a fraction of a second, for example, 1 to 500 milliseconds, up to several hours and longer, say about 24 hours, depending upon the activation means and upon the structures of the hexaarylbiimidazole and the oxidizable compound. With high energy activation means, such as the light from a flash photolysis source, the oxidation occurs within a few milliseconds. When less energetic means are used and high yields of the product of the oxidation reaction are needed, it is preferred to employ longer reaction times.

The triarylimidazolyl free radical formed by the means described above can be represented by the formula

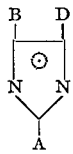

wherein A, B and D stand for the aryl groups described previously and the dotted circle stands for 5 delocalized electrons which satisfy the valences of the carbon and nitrogen atoms of the imidazolyl ring, 4 of said electrons being paired (which may be represented as two conjugated double bonds), the fifth electron being odd. In other words, the triarylimidazolyl radical contains an unpaired electron delocalized throughout the conjugated system. Biimidazole dissociation to the free radical may be detected not only by the oxidizing activity of the radicals so produced but also by electron paramagnetic resonance, ultraviolet spectra and visible spectra. The biimidazoles can exist as isomers which differ in how the imidazolyl units are linked together and which also differ spectrally and in their sensitivity to heat and pressure. All such isomers, however, dissociate to the same triarylimidazolyl radical which is the effective oxidant of this invention. For example, White and Sonnenberg (Abstracts, 144th Am. Chem. Soc. Meeting, Los Angeles, Mar. 31–Apr. 15, 1963, pages 55M–56M) describe two 2,2',4,4',5,5',-hexaphenylbiimidazole isomers. One, herein referred to as Isomer A, is thermally more resistant to dissociation into 2,4,5-triphenylimidazolyl radicals than the other isomer B. Thus on dissolution in most organic solvents at room temperature, Isomer A gives a very weak color and a correspondingly weak ESR signal. Whereas Isomer B gives an intense violet to pink color and a very strong ESR signal. Accordingly for low-temperature oxidations (e.g., at temperatures of solid carbon dioxide-acetone mixtures), Isomer B is preferred as the latent oxidant, while at room temperature and above, Isomer A is preferred.

A particular advantage of the invention is that the oxidation reaction inherent in the biimidazole/oxidizable compound system can be controlled so that it occurs only at a time suitable to the operator. Thus, simple admixture of the oxidizable compound with the biimidazole does not result in an immediate oxidation reaction unless the means described above are employed to result in biimidazole activation.

The hexaarylbiimidazoles and the imidazolyls formed therefrom are relatively unreactive toward oxygen. This is shown by bubbling oxygen through a benzene solution of the biimidazole while irradiating it with ultraviolet light. Imidazolyl radicals generated by the photolytic dissociation of the biimidazole are still present in high concentration even after 30 hours of continued irradiation and oxygenation. This stability of the invention oxidants to oxygen is further shown, for example, by the identical reaction rates of the imidazolyls with aromatic amines in the presence or absence of air. This lack of reactivity toward oxygen is advantageous because it eliminates the need for a protective atmosphere and allows handling, storing and using compositions of this invention in air.

(D) Usefulness of the invention

The compositions and the oxidation method of this invention are useful in such diverse fields as organic synthesis, including dye manufacture, dyeing of textiles and other materials, photography, thermography and pattern layout. The compositions are also useful to sense thresholds of light, heat, pressure, electron beams, and combinations thereof, through the chemical changes, including color changes, they undergo when activated by such stimuli.

This invention is particularly useful for light-actuated colored image formation and provides a dry, non-silver photographic process capable of imaging in various colors and shades on various substrates, including fabrics, paper and similar fibrous sheet material. Apparatus useful in conducting photographic dye-printing is described in U.S. Pats. 2,214,365 and 2,655,802. Even very soft paper, as for example tissue paper, which has been treated with a mixture of hexaarylbiimidazole and a color-forming oxidizable system of this invention, can be readily printed by projecting the desired graphic pattern onto the treated paper and irradiating it to effect the color-forming oxidation reaction.

The compositions of this invention also lend themselves to thermographic imaging techniques. For example, heat-sensitive copying papers, obtained by treating a paper with a mixture of a hexaarylbiimidazole and an essentially colorless but color-forming oxidizable compound or mixture of compounds as described above, are simply heated at imaging temperatures to develop a colored image according to a desired pattern, achieved for example with stencils in conjunction with an infrared lamp. The color can be widely varied by varying the oxidizable color-forming compound. U.S. Pats. 2,740,895 and 3,089,952 described representative methods and apparatus for applying heat thermographically.

Although the invention oxidation process is particularly useful for forming color, it may also be used to inhibit color formation in the image-forming systems, for example, such as those described above by incorporating therein a non-color-forming, oxidizable compound such as a sulfhydryl compound which is more readily oxidized than the color-forming oxidizable compound. This oxidation may be used to convert polythiols into polydisulfide polymers. It is also useful as a means of reducing the undesirable odors of low-molecular-weight sulfhydryl compounds.

(E) Examples

The following representative examples serve to further illustrate the invention:

Example 1.—A method for conducting the invention oxidation process is flash photolysis described by Porter, Proc. Roy. Soc. (London) A200, 284 (1950) and Lindquist, Arkiv. Kem. 16 79–138 (1961).

The cylindrical quartz cell reaction vessel of the flash photolysis apparatus is filled with a methanol solution $1.01 \times 10^{-4}$ molar in N,N,N',N'-tetramethyl-p-phenylenediamine dihydrochloride and $2 \times 10^{-4}$ molar in 2,2'-bis(o-chlorophenyl)-4,4',5,5'-tetraphenylbiimidazole. The reaction vessel is illuminated by a flash tube through a filter which passes UV light at 3660 A. which is absorbed only by the biimidazole. As a result of the light activation of the biimidazole, the N,N,N',N'-tetramethyl-p-phenylenediamine is oxidized to Wurster's Blue (Lewis and Lipkin, J. Am. Chem. Soc. 64, 2801 (1942)) which is identified by its color and spectra. The N,N,N',N'-tetramethyl-p-phenylenediamine dihydrochloride has a formal oxidation potential of 0.96 volt. By means of the flash photolysis technique, the rate of reaction of the 2-(o-chlorophenyl)-4,5-diphenylimidazolyl radical is measured by the rate of decay in intensity of the characteristic 3900 A. absorption peak of this radical and the rate of formation of the Wurster's Blue is measured by the rate of increase of its characteristic 6200 A. absorption peak. The rate constant for reaction of the radical is $7 \times 10^7$ liter/mole sec. and the rate constant for formation of the Wurster's Blue is identical. Thus, the imidazolyl reacts only with the diamine.

In a similar manner 2-(o-chlorophenyl)-4,5-diphenylimidazolyl radical generated by UV irradiation of 2,2'-bis(o - chlorophenyl) - 4,4',5,5' - tetraphenylbiimidazole oxidizes N,N,N',N'-tetramethylbenzidine and N,N,N',N'-tetrabutylbenzidine.

The presences of air during the photolysis does not alter the reaction rate constants. This shows, in contrast to the behavior of most free radicals, the non-reactivity of the imidazolyl radicals to oxygen.

Example 2.—A solution prepared in the dark from 1.3 g. of 2,6-di-t-butylphenol, 1.5 g. of 2,2'-bis(o-chlorophenyl)-4,4',5,5'-tetraphenylbiimidazole and 100 ml. benzene is placed 6 inches below a 275-watt sun lamp. When the solution is irradiated for one hour, the initially colorless solution becomes bright yellow. Concentration of the yellow solution on a steam bath yields a mixture of dark red and light yellow crystals. The mixture of crystals is treated with petroleum ether to dissolve the red crystals followed by filtration to separate the yellow crystals. Addition of methanol to the filtrate precipitates 0.293 g. of crude 3,3',5,5' - tetra - t-butyl-4,4'-diphenoquinone. After purification by crystallization from the mixture of petroleum ether and methanol, the red crystals sinter at 200° C. and melt over the range 245.0–245.5° C. This melting range is identical to that of an authentic sample of 3,3',5,5'-tetra-t-butyl-4,4'-diphenoquinone prepared according to the procedure of Hart et al., J. Am. Chem. Soc. 73, 3179 (1951). Identity of the product is confirmed by its infrared, ultraviolet and visible spectra.

The oxidation potential of 2,6-di-t-butylphenol is 1.15 volts.

Kept in the dark at room temperatures, the original solution remains unchanged.

Example 3.—Example 2 is repeated with 2,6-dimethoxyphenol to obtain a purple precipitate of 3,3',5,5'-tetramethoxy-4,4'-diphenoquinone, commonly called ceruliquinone. The formal oxidation potential of 2,6-dimethoxyphenol is 0.88 volt.

The original solution remains unchanged in the dark at room temperature.

Example 4.—2,6-dimethoxyphenol and hexaphenylbiimidazole, Isomer A, in about equal weights, are heated in benzene solution at 50–80° C. for 5 minutes to obtain ceruliquinone.

The original unheated solution remains unchanged when stored in the dark at room temperatures.

Example 5.—When 2,6-dimethoxyphenol and hexaphenylbiimidazole, Isomer B (about 1 g. each) are added to benzene (about 100 ml.) reaction takes place at room temperature (about 30° C.) to yield ceruliquinone.

Example 6.—In dim light, to 100 ml. of methanol are added 0.635 g. of 3-methyl-2-benzothiazolone hydrazone hydrochloride, 0.468 g. of N,N-dimethylaniline hydrochloride and 1.0 g. of 2,2'-bis(o-chlorophenyl)-4,4',5,5'-tetraphenylbiimidazole. The resulting clear, colorless solution is irradiated for 10 minutes with a 275-watt sun lamp. The solution is diluted with 100 ml. water and extracted with three 50-ml. portions of petroleum ether. The petroleum ether. The petroleum ether extracts are discarded and the aqueous methanol solution is concentrated on a steam bath, cooled to room temperature, and filtered. The filtrate is saturated with sodium chloride. On standing, a blue-black crystalline solid forms. The visible spectra of a methanol solution of this solid is identical to that of 3 - methyl - 2-(p-dimethylaminophenylazo)benzothiazolium chloride prepared according to the method of Hunig and Fritsch, Ann. 609, 143 (1957).

Example 7.—Example 6 is repeated with hydroquinone as the coupling component in place of the N,N-dimethylaniline hydrochloride to produce 3-methyl-2-(2,5-dihydroxyphenylazo)benzothiazolium chloride.

Example 8.—This example illustrates the use of the light-activated oxidative coupling reaction of the type described in the preceding example to produce a colored image on paper.

To 50 ml. of a solution containing 80 parts by volume of methanol and 20 parts by volume of N,N-dimethylformamide are added in the dark 0.198 g. of 3-methyl-6-methoxy-2-benzothiazolone hydrazone, 0.151 g. of N,N-dimethylaniline hydrochloride and 0.650 g. of 2,2'-bis(o-chlorophenyl) - 4,4',5,5'-tetraphenylbiimidazole. Unsized paper is impregnated with the resulting solution and the wet paper is dried by infrared heating. The dried, impregnated paper which is kept in the dark is essentially unchanged in appearance from that of an untreated paper. Exposure of a sheet of the treated paper to the light of a 275-watt sun lamp results in formation of the intense blue color of 3-methyl-6-methoxy-2-(p-dimethylaminophenylazo)benzothiazolium chloride. Another sheet of the treated paper is exposed for about one minute to the sun lamp through a mask so that the paper is irradiated by a pattern of UV light. An image corresponding to the mask forms on the paper without any further developing step.

Example 9.—The procedure of Example 8 is employed to impregnate paper with a solution of 0.196 g. of 3-methyl-6-methoxy-2-benzothiazolone hydrazone, 1.3 g. of phenol and 1.3 g. of 2,2'-bis(o-chlorophenyl) - 4,4',5,5' - tetraphenylbiimidazole in 50 ml. of a 20–80 by volume N,N-dimethylformamide: benzene solution. After being dried, the paper is exposed under a graphic pattern to ultraviolet light, to form a violet image as a result of the oxidative formation of 3 - methyl-6-methoxy-2-(p-hydroxyphenylazo)benzothiazolium salt.

Example 10.—In dim light, 0.136 g. of N,N-diethyl-p-phenylenediamine, 0.151 g. of 2-thenoylacetonitrile and 0.65 g. of 2,2'-bis(o-chlorophenyl)-4,4',5,5'-tetraphenylbiimidazole are added to 50 ml. of a solution of 20 parts by volume N,N-dimethylformamide and 80 parts of methanol. Unsized paper is immersed into this solution and then dried. Exposure of this essentially colorless paper to a pattern of ultraviolet light of wavelength 2500–4050 A. gives an intense red violet image. The N,N-diethyl-p-phenylenediamine has a formal oxidation potential of 0.66 volt.

Example 11.—To 50 ml. of a solution containing by volume 20 parts N,N-dimethylformamide and 80 parts methanol are added 0.272 g. of N,N-dimethyl-p-phenylenediamine (formal oxidation potential=0.66 volt), 0.094 g. of phenol and 0.66 g. of 2,2' - bis(o - chlorophenyl)-4,4',5,5'-tetraphenylbiimidazole. Unsized paper is impregnated with the resulting solution and then is dried by infrared heating. These operations are carried out in dim light. Exposure of the dry, treated paper to the light of a sun lamp turns the paper blue.

Example 12.—A sample of paper prepared as in Example 11 but unexposed to strong light is heated for several minutes at about 175° C. to give a blue color as a result of formation of the blue indoaniline dye having the structure

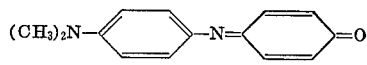

Example 13.—N,N-dimethylaniline is substituted for the phenol in Example 12. Paper impregnated with the resulting solution becomes red when irradiated with ultraviolet light or when heated several minutes at 175° C.

Example 14.—Under an atmosphere of dry nitrogen, a mixture of 2.7 g. of 1-butanethiol, 3.3 g. of 2,2'-bis(o-chlorophenyl)-4,4',5,5'-tetraphenylbiimidazole and 20 ml. of benzene is stirred and heated to reflux. The refluxing solution contained in a flask of Pyrex brand glass is irradiated by light from a 275-watt sun lamp at a distance of 2 inches. The initially clear yellow solution becomes a wine red and then gradually changes to a light tan color. After 20 hours, the irradiation is stopped and the solution is cooled to room temperature. A solid which precipitates is isolated by filtration. This solid, M.P. 193.0–194.5° C., is found by infrared spectrum analysis to be 2-(o-chlorophenyl)-4,5-diphenylimidazole. A high concentration of butyl disulfide is found in the filtrate by gas chromatographic analysis, whereas no disulfide is present in the starting material. The formal oxidation potential of 1-butane thiol is 0.73 volt.

Example 15.—Under an atmosphere of dry nitrogen, a mixture of 0.44 g. of thiophenol (formal oxidation potential=.9 volt), 1.2 g. of 2,2',4,4',5,5'-hexaphenylbiimidazole (Isomer A) and 15 ml. of benzene is stirred and heated to reflux. After 20 hours at reflux with stirring, the reaction mixture is cooled to room temperature and filtered to remove the solid which has formed. The solid, M.P. 190.0–191.5° C., is shown by infrared spectrum analysis to be identical to a known sample of 2,4,5-triphenylimidazole. Gas chromatographic analysis of the filtrate shows a high concentration of phenyl disulfide.

The preceding representative examples may be varied within the scope of the present total specification disclosure, as understood and practices by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A composition comprising
  (A) a 2,2',4,4',5,5'-hexaarylbiimidazole wherein the aryl groups contain one to two rings which can be substituted with substituents that are inert to component (B) and that have a Hammett para sigma value between about −.5 to +.8 and are free of Zerewitinoff hydrogen; in intimate admixture with
  (B) an oxidizable compound having a formal oxidation potential of 1.35 volts or less relative to a standard calomel electrode and being selected from the class consisting of
    (1) p-arylenedifertiaryamines wherein the arylene groups are phenylene or diphenylene and the groups attached to the amine nitrogen are lower alkyl or lower alkylene;
    (3) p-phenylenediamines wherein one amino group is primary and the other is tertiary in which the groups attached to the tertiary nitrogen are lower alkyl, said p-phenylenediamines being in admixture with a coupling compound selected from phenols, N,N-di(lower)alkyl phenylamines, or active methylene coupling compounds;
    (3) imino hydrazides and their N-acyl derivatives which are oxidizable to diazonium compounds, in admixture with a coupling compound selected from phenols, N,N-disubstituted-arylamines, or active methylene coupling compounds;
    (4) o,o'-disubstituted phenols wherein the substituents are halo, lower alkyl or lower alkoxy; and
    (5) organic sulfhydryl compounds; said hexaarylbiimidazole present in at least an amount sufficient to oxidize said oxidizable compound.

2. The composition of claim 1 wherein the aryl groups of the biimidazole are phenyl and the 2 and 2' phenyl groups are substituted in the ortho position with a substituent that is inert to component (B) and has a Hammett para sigma value between about −.4 to +.4 and is free of Zerewitinoff hydrogen.

3. The composition of claim 2 wherein the 4,4',5, and 5' phenyl groups of the biimidazole are unsubstituted and the 2 and 2' phenyl groups of the biimidazole are substituted in the ortho position with fluorine, chlorine, bromine, lower alkyl or lower alkoxy.

4. The composition of claim 2 wherein the oxidizable compound is a p-arylenedifertiaryamine defined in (B) (1) therein.

5. The composition of claim 2 wherein the oxidizable compound is a p-phenylenediamine defined in (B)(2) therein, in admixture with (a) a phenol having a free position available for coupling and which can be substituted with halo, lower alkyl or lower alkoxy; (b) an N,N-di(lower)alkyl phenylamine having a free position available for coupling; (c) a beta-diketone; (d) a beta-keto ester; (e) a beta-ketoamide, or (f) a beta-keto nitrile.

6. The composition of claim 2 wherein the oxidizable compound is an imino hydrazide or an N-acyl derivative thereof which is oxidizable to a diazonium compound, in admixture with (a) a phenol having a free position available for coupling and which can be substituted with halo, lower alkyl or lower alkoxy; (b) an N,N-di(lower)alkyl phenylamine having a free position available for coupling; (c) a beta-diketone; (d) a beta-keto ester; (e) a beta-ketoamide, or (f) a beta-keto nitrile.

7. The composition of claim 2 wherein the oxidizable compound is an o,o'-disubstituted phenol wherein the substituents are halo, lower alkyl or lower alkoxy.

8. The composition of claim 2 wherein the oxidizable compound is a sulfhydryl compound.

9. The composition of claim 2 in a solvent that is essentially inert to the ingredients of the composition.

10. The mixture of the composition of claim 2 in a polymeric binder.

11. The composition of claim 1 coated on a substrate.

12. The composition of claim 1 coated on a film.

References Cited

UNITED STATES PATENTS

| | | | |
|---|---|---|---|
| 3,042,515 | 7/1962 | Wainer | 96—48 |
| 3,056,673 | 10/1962 | Wainer | 96—48 |
| 3,113,024 | 12/1963 | Sprague et al. | 96—48 |
| 3,242,122 | 3/1966 | Cheng | 260—29.6 |
| 3,361,755 | 1/1968 | Green | 260—309 |
| 3,269,626 | 8/1966 | Albrecht | 117—21 |
| 3,432,335 | 3/1969 | Schiller et al. | 117—106 |

FOREIGN PATENTS

| | | |
|---|---|---|
| 6,479 | 5/1963 | Japan. |

OTHER REFERENCES

White et al.: A.C.S. Abstract of Papers, No. 144, April 1963, pp. 55 to 56. Chem. Abst 59, 6382 (1963).)

Baumgärtel: Z für Naturforschung, 18b, 406–412, May 1963.

Fieser and Fieser: Advanced Organic Chemistry, New York, Reinhold Publishing Corp. (1961).

Walling, C., Free Radicals in Solution, New York, John Wiley and Sons, Inc., pp. 4 and 33.

WILLIAM D. MARTIN, Primary Examiner

M. SOFOCLEOUS, Assistant Examiner

U.S. Cl. X.R.

96—48; 250—65